United States Patent
Beffa

(10) Patent No.: US 7,689,127 B1
(45) Date of Patent: Mar. 30, 2010

(54) DEFORMABLE MIRRORS FOR MULTI-ACCESS LASER COMMUNICATIONS TERMINAL

(75) Inventor: James C. Beffa, Boulder Creek, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 828 days.

(21) Appl. No.: 11/107,253

(22) Filed: Apr. 14, 2005

Related U.S. Application Data

(60) Provisional application No. 60/562,234, filed on Apr. 15, 2004.

(51) Int. Cl.
*H04B 10/00* (2006.01)
(52) U.S. Cl. ............................................. 398/122
(58) Field of Classification Search .......... 398/118–131
See application file for complete search history.

(56) References Cited

U.S. PATENT DOCUMENTS

| | | | |
|---|---|---|---|
| 5,594,580 A * | 1/1997 | Sakanaka et al. ............ 398/122 |
| 6,347,001 B1 * | 2/2002 | Arnold et al. ............... 398/122 |
| 6,381,055 B1 * | 4/2002 | Javitt et al. .................. 398/131 |
| 6,464,364 B2 * | 10/2002 | Graves et al. ............... 359/846 |
| 2004/0057655 A1 * | 3/2004 | Mori et al. .................... 385/17 |
| 2004/0141752 A1 * | 7/2004 | Shelton et al. ............. 398/120 |
| 2005/0069324 A1 * | 3/2005 | Tegge et al. ................. 398/118 |
| 2005/0100339 A1 * | 5/2005 | Tegge, Jr. .................... 398/125 |

* cited by examiner

*Primary Examiner*—Quan-Zhen Wang
(74) *Attorney, Agent, or Firm*—McDermott Will & Emery LLP

(57) ABSTRACT

A multi-access laser communications terminal is disclosed. The communications terminal includes a deformable mirror whose surface contour is deformable by one or more actuators. The communications terminal further includes a closed-loop tracking system which controls the one or more actuators to change the surface contour of the deformable mirror in accordance with detected movement of an optical beam in order to keep the optical beam optimally locked on a receiver.

5 Claims, 6 Drawing Sheets

DEFORMABLE MIRRORS FOR MULTI-ACCESS LASER COMMUNICATIONS TERMINAL

CROSS-REFERENCES TO RELATED APPLICATION(S)

The present application claims the benefit of priority under 35 U.S.C. §119 from U.S. Provisional Patent Application Ser. No. 60/562,234 entitled "DEFORMABLE MIRROR FOR MULTI-ACCESS LASER COMMUNICATIONS TERMINAL", filed on Apr. 15, 2004, the disclosure of which is hereby incorporated by reference in its entirety for all purposes.

STATEMENT AS TO RIGHTS TO INVENTIONS MADE UNDER FEDERALLY SPONSORED RESEARCH OR DEVELOPMENT

Not Applicable.

BACKGROUND OF THE INVENTION

The present invention generally relates to a multi-access laser communications terminal, and more particularly to a multi-access laser communications terminal having one or more deformable mirrors for steering laser beams to corresponding receivers.

A multi-access laser communications terminal allows one or more devices to send data to the communications terminal using modulated laser beams. For example, a multi-access laser communications terminal can be mounted on a satellite or high-altitude airship and configured to receive data transmitted from vehicles both in the air and on the ground. Devices mounted on the vehicles modulate a laser beam in accordance with data to be sent and transmit the modulated laser beam to the communications terminal. The communications terminal receives the modulated laser beam using an optical fiber receiver and converts the modulated laser beam into an electronic data format which can be processed and stored.

FIG. 1 is a schematic diagram depicting the basic components of a conventional multi-access laser communications terminal. The communications terminal 100 comprises a telescope 110, a mirror 120 and a receiver 130. Beam source 140 transmits a modulated laser beam 150 to the communications terminal 100. The telescope 110 receives the modulated laser beam 150. The modulated laser beam 150 is deflected by the mirror 120. The deflected modulated laser beam 150 is directed to the receiver 130.

In order to receive the data transmitted by the beam source 140, the modulated laser beam 150 must be kept locked on the receiver 130. However, beam sources are often located on vehicles, such as aerial vehicles, that are often in motion when transmitting the modulated laser beam 150. This motion causes the deflected modulated laser beam 150 to drift from the receiver 130 which can result in loss of the data being transmitted.

Various mechanisms have been devised to keep the modulated laser beam 150 locked on the receiver 130. For example, a MEMS (micro-electromechanical) mirror array might be used to steer the modulated laser beam 150 to the receiver 130. However, the use of a MEMS mirror array introduces loss into the system due to the fill factor of the mirror array.

Alternatively, mechanical actuators might be used to alter the position of the receiver 130 in order to keep the modulated laser beam 150 locked on the receiver 130. While this method avoids the losses associated with a MEMS mirror array, proximity issues arise when multiple beam sources get too close to each other.

Hence, it would be desirable to provide methods and systems that are capable of keeping a modulated laser beam locked on a receiver in a laser communications terminal in a more effective manner.

SUMMARY OF THE INVENTION

The present invention addresses the foregoing concerns by using a deformable mirror to keep an optical beam, such as a modulated laser beam, locked on a receiver. Actuators are controlled to deform the surface contour of the deformable mirror based on detection signals generated by optical sensors positioned around the receiver. When movement of the optical beam relative to the receiver is detected, the surface contour of the deformable mirror is deformed using the actuators such that the optical beam is optimally re-focused on the receiver.

In one embodiment, a communications terminal is disclosed. The communications terminal includes a deformable mirror having a deformable surface and configured to deflect an optical beam from a beam source. The optical beam represents data to be transmitted from the beam source to the communications terminal. The communications terminal further includes a receiver configured to receive the optical beam deflected from the deformable mirror and a controller configured to effectuate control of the surface contour of the deformable mirror such that the deflected optical beam is optimally received by the receiver.

The receiver may further include an optical beam receiver configured to receive the deflected optical beam and a number of optical sensors configured to detect the deflected optical beam. The optical sensors are arranged such that the optical beam receiver is surrounded by the optical sensors.

The communications terminal may further include a number of actuators configured to control the surface contour of the deformable mirror. One or more of the optical sensors forward information relating to the detection of the deflected optical beam to the controller. In response, the controller analyzes the detection information and directs one or more of the actuators accordingly to change the surface contour of the deformable mirror such that the deflected optical beam is optimally received by the optical beam receiver.

The present invention may be deployed in a number of applications. For example, the present invention may be used in a spacecraft, such as a satellite, to facilitate and improve optical communications. Based on the disclosure and teachings provided herein, a person of ordinary skill in the art will know of other ways and/or methods to deploy the present invention in other applications.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

Aspects, advantages and novel features of the present invention will become apparent from the following description of the invention presented in conjunction with the accompanying drawings.

DESCRIPTION OF THE SPECIFIC EMBODIMENTS

Figure 1:
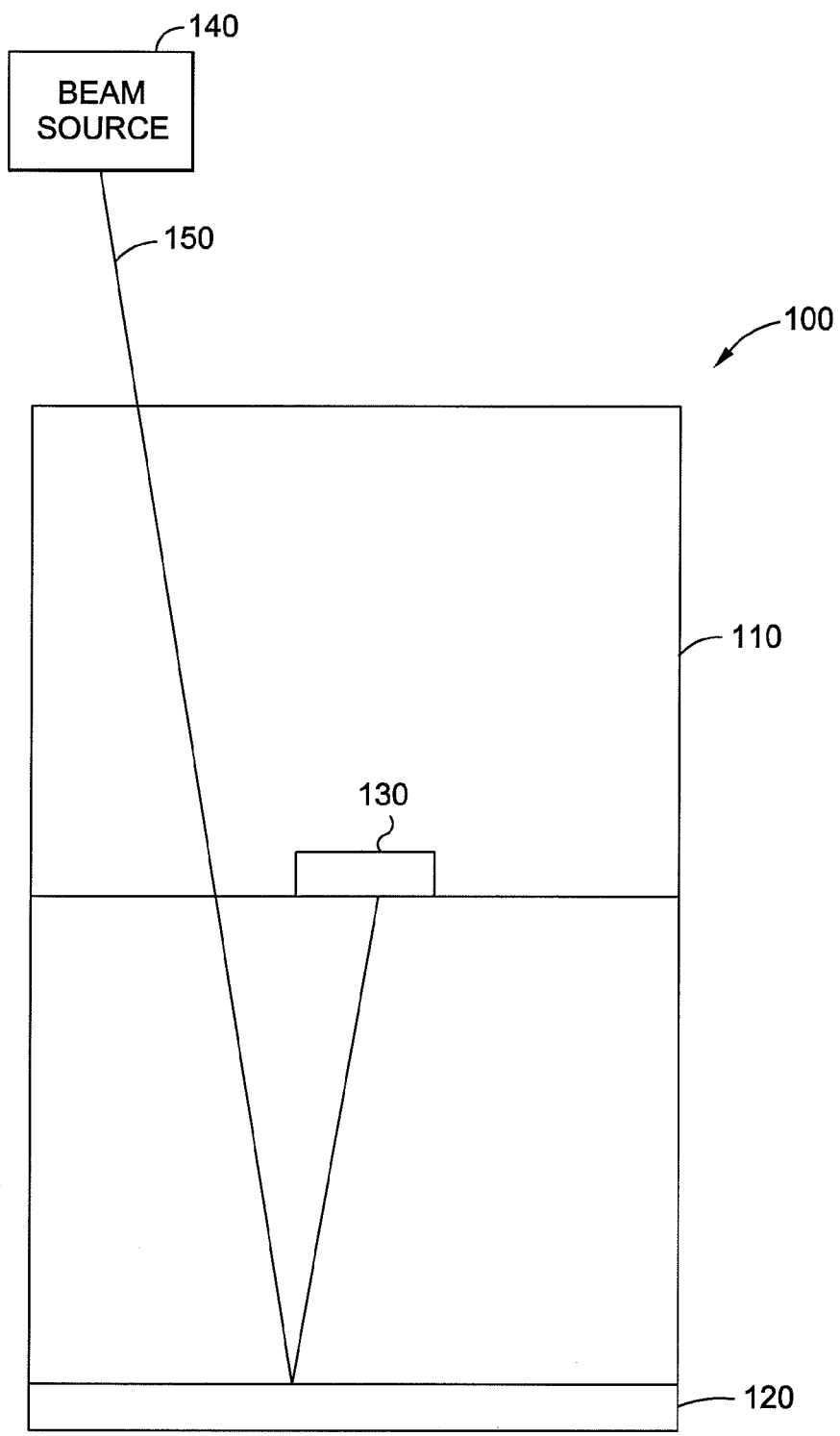
FIG. 1 is a schematic diagram illustrating a conventional multi-access laser communications terminal.
Figure 2:
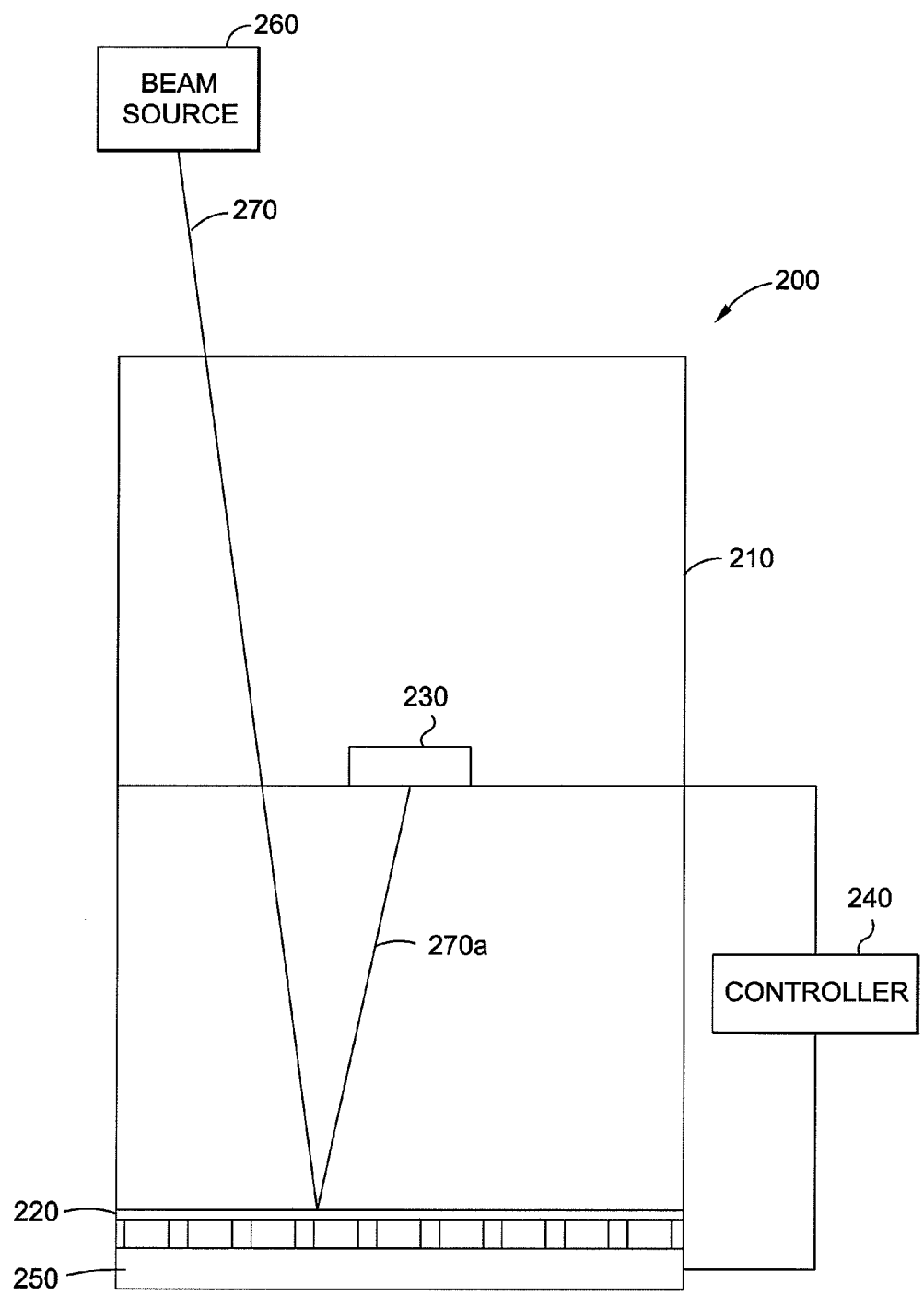
FIG. 2 is a schematic diagram illustrating one embodiment of the present invention.

The present invention in the form of one or more exemplary embodiments will now be described. FIG. 2 illustrates one embodiment of a multi-access optical communications terminal 200 according to the present invention. The communications terminal 200 includes a telescope 210, a deformable mirror 220, a receiver 230, a controller 240 and a number of actuators 250. The receiver 230 is configured to receive an optical beam 270 from a beam source 260. The optical beam 270 may include, for example, a modulated laser beam. The deformable mirror 220 is made of a flexible material such as a metalized film. The deformable mirror 220 has a deformable surface and is configured to deflect the optical beam 270. The actuators 250 are configured to control the surface contour of the deformable mirror 220. The controller 240 is configured to receive information from the receiver 230 and control the actuators 250 accordingly such that the deflected optical beam 270a is continually focused or trained on the receiver 230 at an optimal level, thereby allowing data encoded in the optical beam 270a to be received and processed reliably. Operations of the communications terminal 200 will be further described below.

Figure 3:
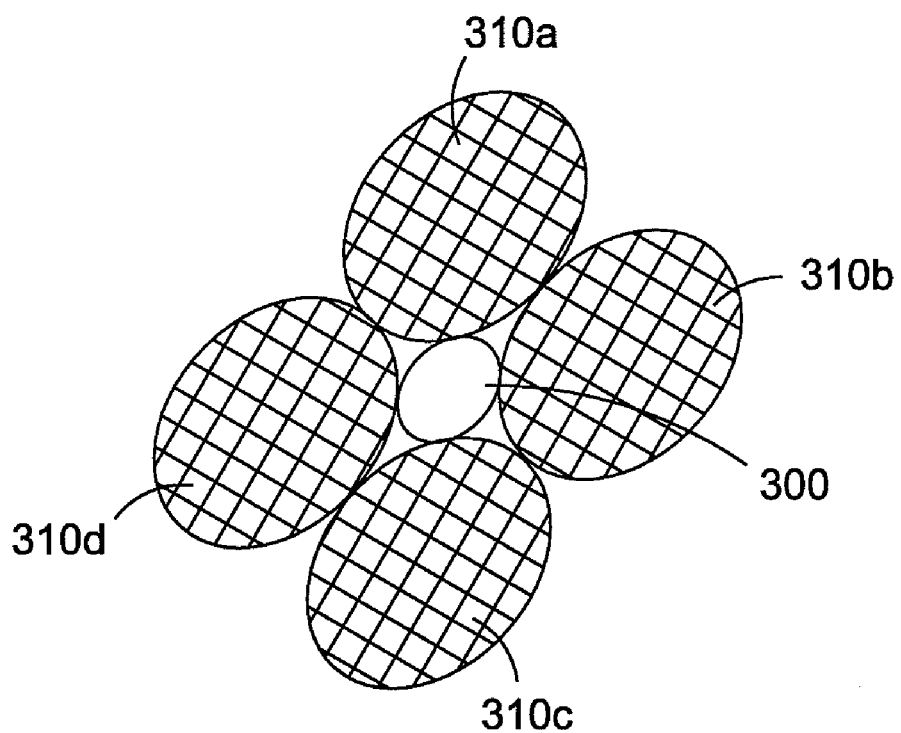
FIG. 3 is a schematic diagram illustrating one embodiment of a receiver according to the present invention.

FIG. 3 illustrates one embodiment of the receiver 230. The receiver 230 includes an optical beam receiver 300 and a number of optical sensors 310a-d. The optical beam receiver 300 is configured to receive the deflected optical beam 270a. The optical sensors 310a-d are configured to detect the deflected optical beam 270a. Such sensors 310a-d are arranged such that they form a quad cell surrounding the optical beam receiver 300. By surrounding the optical beam receiver 230 with the optical sensors 310a-d, movement of the deflected optical beam 270a in all directions may be detected. The number of optical sensors 310a-d that may be included in the quad cell may vary depending on each application.

The communications terminal 200 operates as follows. The optical beam 270 is transmitted from the beam source 260 to the communications terminal 200. The beam source 260 may be located on a moving object including, for example, a spacecraft and a ground vehicle. The telescope 210 receives the optical beam 270. The optical beam 270 is then deflected by the deformable mirror 220 and steered toward the optical beam receiver 300.

Since either the beam source 260 or the communication terminal 200 or both may be in motion, the deflected optical beam 270 may drift away from the optical beam receiver 300. In other words, the deflected optical beam 270 may no longer be optimally focused or trained on the optical beam receiver 300 to allow the data encoded in the optical beam 270 to be received and processed. As the deflected optical beam 270 drifts or moves away from the optical beam receiver 300, the deflected optical beam 270 may be detected by one or more of the optical sensors 310a-d in the quad cell surrounding the optical beam receiver 300.

Signals from the quad cell and the optical beam receiver 300 are continually monitored by the controller 240 to determine which direction the optical beam 270 has drifted. Based on the signals received from the optical sensors 310a-d in the quad cell and the optical beam receiver 300, the controller 240 directs the proper actuators 250 to move and deform the surface contour of the deformable mirror 220 such that the deflected optical beam 270 is optimally refocused or trained on the optical beam receiver 300. In this manner, a closed-loop tracking system is implemented to lock the optical beam 270 on the optical beam receiver 300 in order to compensate for any movement of the beam source 260.

Figure 4:
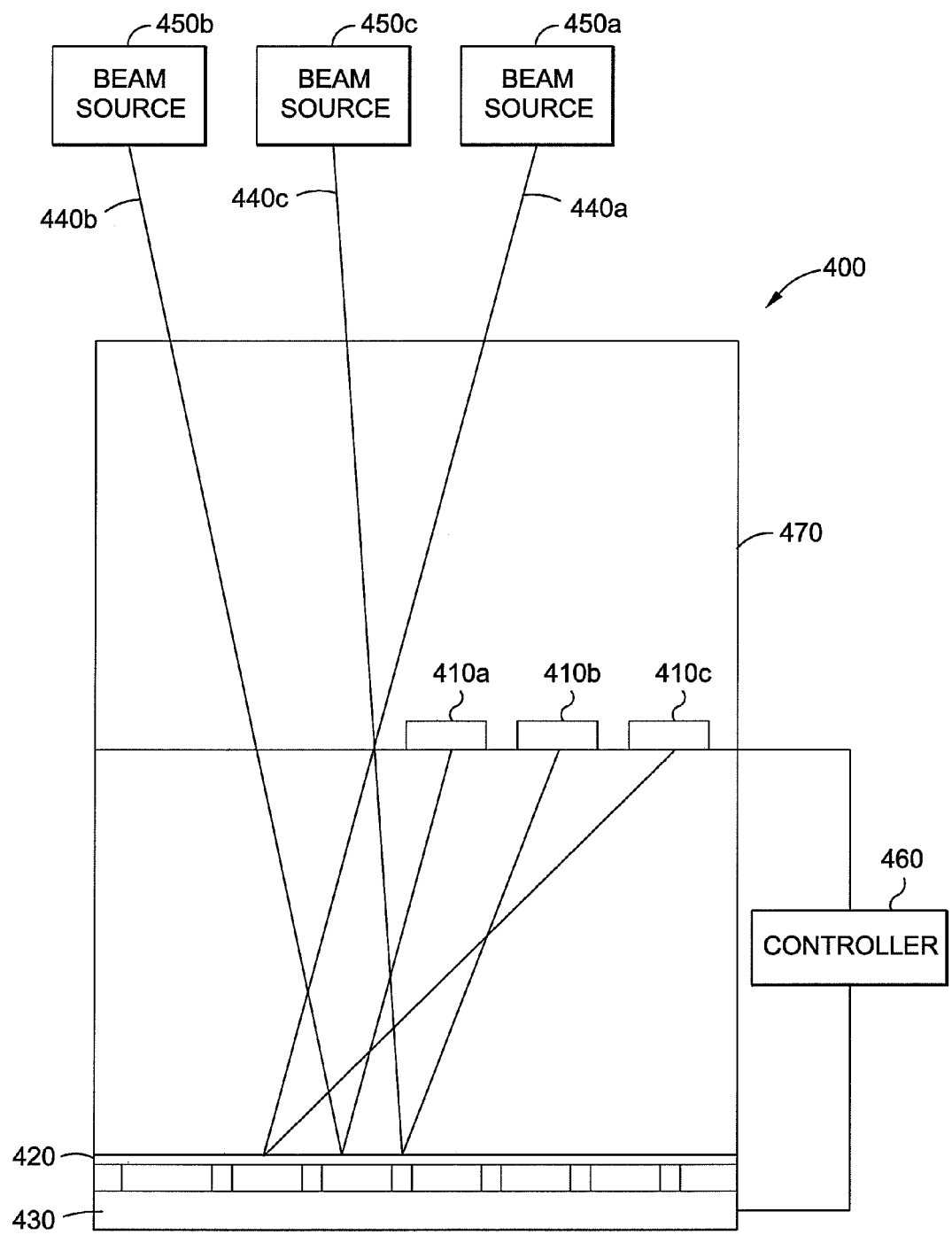
FIG. 4 is a schematic diagram illustrating another embodiment of the present invention.

FIG. 4 illustrates another embodiment of the present invention. The communications terminal 400 includes a telescope 470, a number of receivers 410a-c and a deformable mirror 420. The deformable mirror 420 is further made up of a number of sections (not shown). Each section of the deformable mirror 420 is independently controlled by corresponding groups of actuators 430. The receivers 410a-c, the deformable mirror 420 and the actuators 430 are similar to those described in connection with FIG. 2 above. The number of sections in the deformable mirrors 420, and the number of receivers 410a-c and actuators 430 may vary depending on each application.

The communications terminal 400 as shown in FIG. 4 operates as follows. A number of optical beams 440a-c emanate from corresponding beam sources 450a-c. The optical beams 440a-c are deflected by corresponding sections of the deformable mirror 420 and steered toward their associated receivers 410a-c. The controller 460 monitors each of the receivers 410a-c independently to ensure that the optical beams 440a-c are received optimally. If one or more of the optical beams 440a-c are not received optimally, the controller 460 directs the relevant one(s) of the groups of actuators 430 to change the surface contour(s) of the corresponding section(s) of the deformable mirror 420 such that optimal beam reception is re-established.

Figure 5:
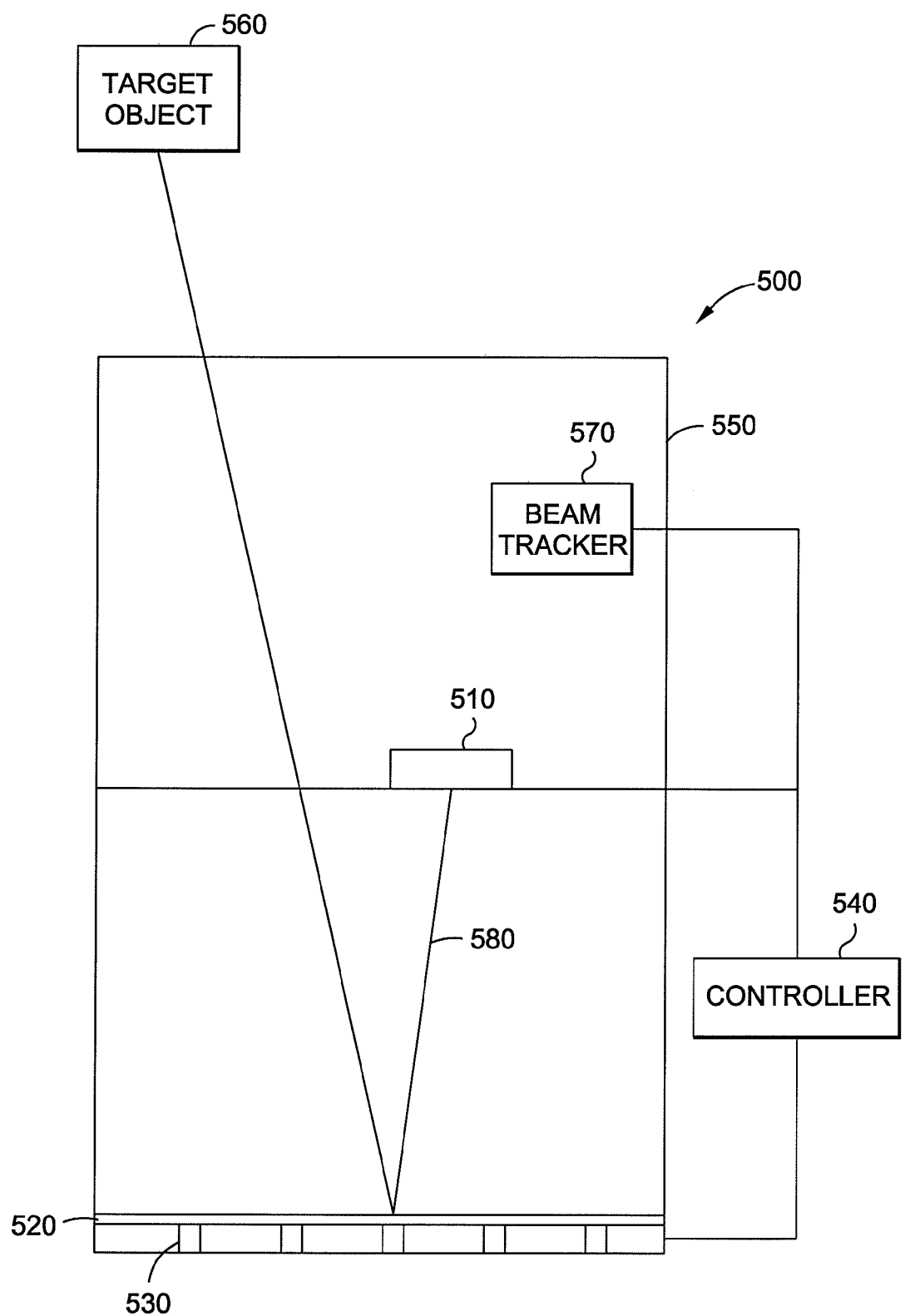
FIG. 5 is a schematic diagram illustrating a further embodiment of the present invention.

FIG. 5 illustrates yet another embodiment of the present invention. The communications terminal 500 includes a telescope 550, a transceiver 510, a deformable mirror 520, a group of actuators 530, a controller 540 and a beam tracker 570. As will be further described below, the communications terminal 500 may be used to provide target tracking on a target object 560 using an optical beam 580, such as, a laser beam.

The transceiver 510 is configured to transmit the optical beam 580 toward the deformable mirror 520. The deformable mirror 520, in turn, deflects the optical beam 580 in a desired direction. The deflected optical beam 580 is then focused or trained on the target object 560. Focusing the optical beam 580 on the target object 560 may serve various purposes including, for example, precision target guidance in an object tracking system or a missile system.

The deformable mirror 520 and the group of actuators 530 are similar to those described in connection with FIG. 2 above.

The beam tracker 570 is configured to monitor the location of the deflected optical beam 580 on the target object 560. Information captured and generated by the beam tracker 570 is provided to the controller 540 for processing.

The controller 540 is configured to receive information from the transceiver 510 and the beam tracker 550 and utilize such information to control the deformable mirror 520 via the group of actuators 530.

The communications terminal 500 as shown in FIG. 5 operates as follows. The transceiver 510 emits the optical beam 580 toward the deformable mirror 520. The optical beam 520, in turn, is deflected by the deformable mirror 520 and focused on the target object 560. The beam tracker 570 monitors the location of the optical beam 580 on the target object 560. Since either the communications terminal 500 or the target object 560 or both may be in motion, the deflected optical beam 580 may need to be continually adjusted in order to keep the deflected optical beam 580 locked on the target object 560.

Locking the deflected optical beam 580 on the target object 560 may be achieved as follows. When the beam tracker 570 determines that the deflected optical beam 580 is no longer optimally locked on the target object 560, relevant information is forwarded to the controller 540. In response, the controller 540 directs the group of actuators 530 to change the surface contour of the deformable mirror 520 in such a way that the deflected optical beam 580 resumes an optimal locked position on the target object 560.

Figure 6:
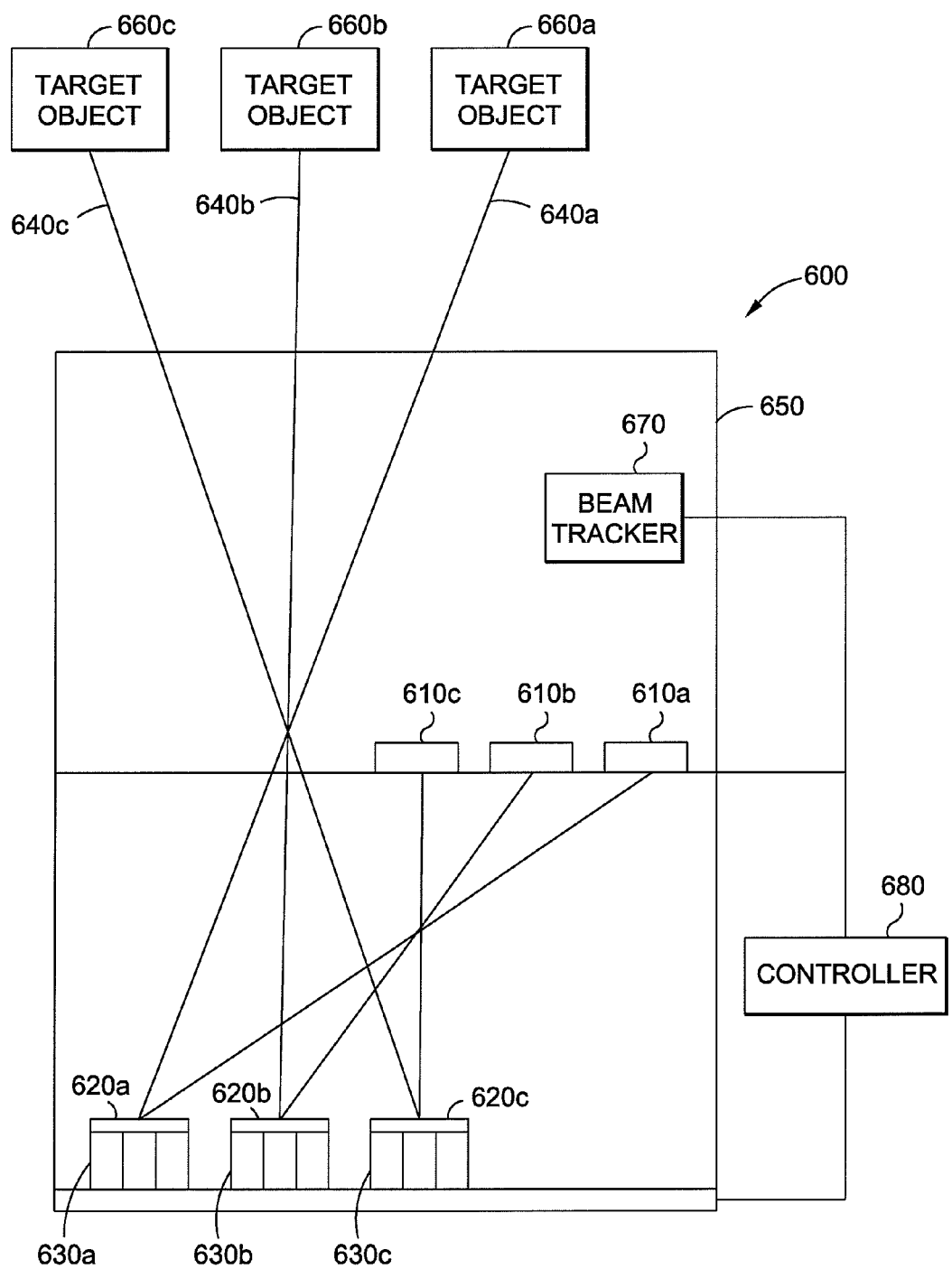
FIG. 6 is a schematic diagram illustrating yet another embodiment of the present invention.

FIG. 6 illustrates another embodiment of the present invention. The communications terminal 600 includes a telescope 650, a number of transceivers 610a-c, a number of deformable mirrors 620a-c, a group of actuators 630a-c, a controller 680 and a beam tracker 670. Similar to the communications terminal 500 shown above in FIG. 5, the communications terminal 600 may be used to provide independent target tracking on multiple target objects 660a-c using optical beams 640a-c respectively.

Each of the transceivers 610a-c is configured to independently transmit an optical beam 640a-c toward the corresponding deformable mirror 620a-c. The deformable mirror 620a-c, in turn, deflects the optical beam 640a-c in a desired direction. The deflected optical beam 640a-c is then focused or trained on the corresponding target object 660a-c. Focusing the optical beam 640a-c on the target object 660a-c may serve various purposes including, for example, precision target guidance in an object tracking system or a missile system.

The deformable mirrors 620a-c and the group of actuators 630a-c are similar to those described in connection with FIG. 2 above.

The beam tracker 670 is similar to the one described in FIG. 5 above and is configured to monitor the respective locations of the deflected optical beams 640a-c on the target objects 660a-c. Information captured and generated by the beam tracker 670 is provided to the controller 680 for processing.

The controller 680 is configured to receive information from the transceivers 610a-c and the beam tracker 670 and utilize such information to independently control the deformable mirrors 620a-c via the group of actuators 630a-c.

Operations of the communications terminal 600 are similar to those of the communications terminal 500 as shown in FIG. 5 above, except that the communications terminal 600 is capable of handling independent target tracking on multiple target objects 660a-c.

It should be understood that the present invention as described above can be implemented in a combination of software and hardware, in the form of control logic in a modular or integrated manner. Based on the disclosure and teachings provided herein, a person of ordinary skill in the art will appreciate other ways and/or methods to implement the present invention.

The above description is illustrative but not restrictive. Many variations of the present invention will become apparent to those skilled in the art upon review of the disclosure. The scope of the present invention should, therefore, be determined not with reference to the above description, but instead should be determined with reference to the pending claims along with their full scope or equivalents.

What is claimed is:

1. A communications terminal comprising:
   a deformable mirror having a plurality of sections, each section having a deformable surface and configured to deflect a corresponding optical beam from an associated moveable beam source, wherein each optical beam contains data transmitted from the associated beam source to the communications terminal;
   a plurality of receivers, each receiver configured to receive an optical beam deflected from a corresponding section of the deformable mirror; and
   a controller configured to effectuate control of the surface contour of each of the plurality of sections of the deformable mirror such that the optical beam deflected by each of the plurality of sections of the deformable mirror is locked on the corresponding receiver when the associated beam source is in motion relative to the communications terminal.

2. The communications terminal of claim 1 wherein at least one of the plurality of receivers further comprises:
   an optical beam receiver configured to receive the deflected optical beam from the corresponding section of the deformable mirror;
   a plurality of optical sensors configured to detect the deflected optical beam, wherein the plurality of optical sensors are arranged such that the optical beam receiver is surrounded by the plurality of optical sensors.

3. The communications terminal of claim 1 further comprising:
   a plurality of groups of actuators, each group of actuators configured to control the surface contour of a corresponding section of the deformable mirror;
   wherein one or more of the plurality of optical sensors associated with the at least one of the plurality of receivers forward information relating to the detection of the deflected optical beam to the controller;
   wherein the controller is further configured to analyze the detection information and direct the group of actuators associated with the corresponding section of the deformable mirror to change the surface contour of the corresponding section of the deformable mirror such that the deflected optical beam is locked on the corresponding receiver.

4. The communications terminal of claim 1 wherein at least one of the optical beams is a modulated laser beam.

5. A spacecraft having the communications terminal as recited in claim 1.

* * * * *